INVENTOR.
ANIESE E. SEED
BY
Thomas H. Grafton
ATTORNEY

Dec. 7, 1965   A. E. SEED   3,221,843
ADJUSTABLE DASHPOT
Filed Sept. 24, 1964   2 Sheets-Sheet 2

INVENTOR.
ANIESE E. SEED
BY
Thomas H. Grafton
ATTORNEY

United States Patent Office 3,221,843
Patented Dec. 7, 1965

3,221,843
ADJUSTABLE DASHPOT
Aniese E. Seed, Toledo, Ohio, assignor to Toledo Scale Corporation, Toledo, Ohio, a corporation of Ohio
Filed Sept. 24, 1964, Ser. No. 398,987
5 Claims. (Cl. 188—87)

This invention relates to dashpots.

It is common practice to equip precision automatic weighing scales with hydraulic dashpots to control the motion of the scales' lever systems so that the scales' indicators quickly come to rest after changes in load. Dashpots employed for this purpose usually comprise a liquid filled cylinder and a loosely fitted piston operating within the cylinder. The piston is attached, by means of a stem and pivotable connection, to some point of the lever system which moves during a weighing operation. The amount of force developed by the dashpot for a given lever velocity is a function of the clearance between the piston and the walls of the cylinder and the restriction of additional adjustable by-passes. In order to secure adequate damping it is necessary that the plunger be a fairly close fit within the cylinder. Ordinary dashpots are unsatisfactory in short stroke, e.g., 0.004 inch, checkweighers because of the friction which they produce which is caused by the plunger rubbing on the cylinder walls and by the above pivotable connection on the lever and also because they produce bubbles in the liquid which interferes with fast action.

Accordingly, the objects of this invention are to improve dashpots, to increase the precision of dashpots, to facilitate the mechanical adjustment of dashpots, to simplify the construction of dashpots, to compensate dashpots for changes in temperature, to provide a dashpot which has no rubbing parts, and to connect a dashpot to a condition responsive member through a rigid connection.

One embodiment of this invention enabling the realization of these objects is a dash pot having an oil-filled cavity with a narrow, restricted area defined by two parallel walls and an enlarged area around all four sides of the restricted area. A vane (1/16 inch plate) is rigidly connected by means of a rod (1/16 inch diameter) to a weighing scale lever, the rigid connection being on contrast to the usual pivotal connection of a dashpot plunger rod and the small diameter rod being in contrast to the usual relatively large diameter plunger rod. The vane is movable within the restricted area of the body between the parallel walls in the plane of lever motion and produces a damping action by viscous shear. The vane is attached to the weighing scale lever by a method that ensures that no parts rub. The restricted area which is defined by the two parallel walls is formed by two juxtaposed polyethylene blocks which automatically make the restricted area more restricted by expansion when the temperature rises and the viscosity of the oil drops to keep the viscous force more or less constant with change in temperature. The desired damping action is adjustable and is attained by sliding the body of the dashpot in a stationary track in the plane of the vane. This adjustment, which does not affect weighing and can be done while weighing takes placee, makes the vane operate more or less within the restricted area, that part of the vane which does not operate within the restricted area being movable in the oil in the enlarged area around all four sides of the restricted area, i.e., the effective shear area is varied by the adjustment.

In accordance with the above, one feature of this invention is the fact that the dashpot has no rubbing parts.

Another feature resides in the fact that the vane is rigidly connected to the lever to eliminate friction at this connection.

Still another feature resides in the automatic compensation, by means of the polyethylene blocks, in predetermined manner by expansion or contraction corresponding to the temperature-viscosity characteristics of the fluid used so that the action of the dashpot in damping the oscillations of the scale is substantially uniform under widely varying temperature conditions.

Another feature resides in adjusting the amount of damping afforded by the dashpot without affecting weighing and while weighing takes place and in the ease with which this adjustment is made.

A further feature resides in the superior simplicity of the dashpot.

Another feature resides in the fact that the force is almost produced entirely by shear therefore the action is linear, i.e., the force-velocity relationship is linear, and not non-linear as in the above ordinary hydraulic dashpots.

Still another feature resides in the fact that very little fluid is moved in the shear dashpot in contrast to the large amounts of fluid which is moved at high velocity in the above ordinary hydraulic dashpots thus slowing down the scale response.

The above and other objects and features of this invention will be appreciated more fully from the following detailed description when read with reference to the accompanying drawings wherein.

Figure 1:
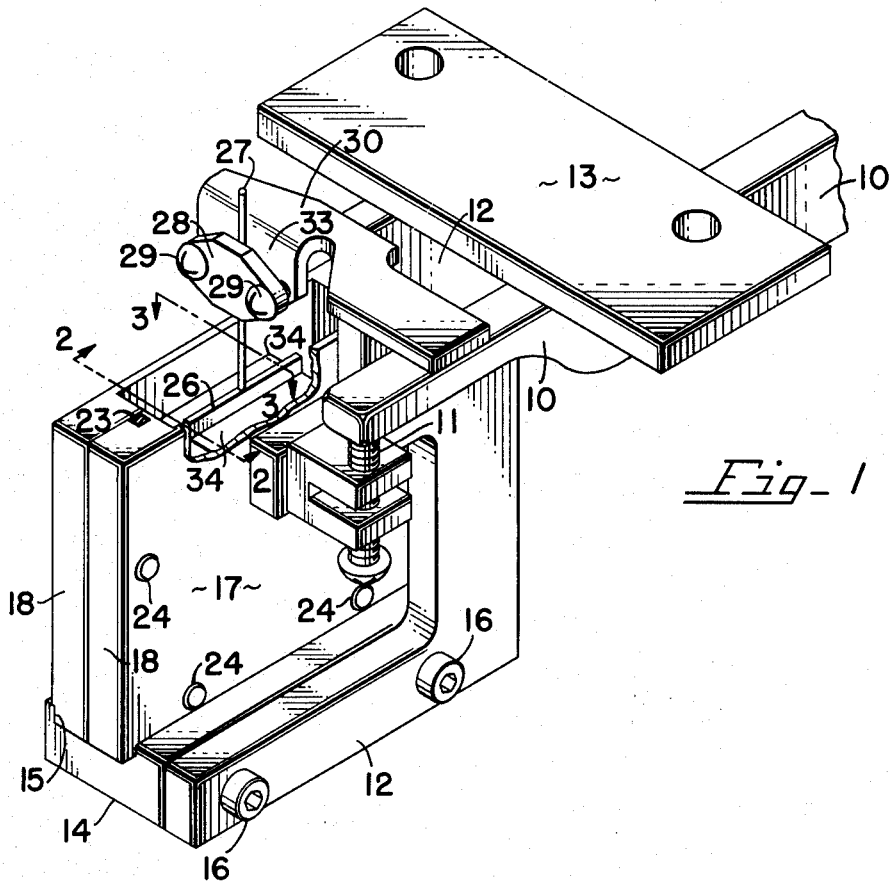
FIG. 1 is a fragmentary perspective view of a load responsive weighing scale lever connected to a dashpot according to this invention.

Referring to the drawings, in FIG. 1 an ordinary pivotably mounted checkweigher lever 10 is shown in its no-load position with its end resting against an adjustable stop 11. When load is placed upon the checkweigher, such lever end moves up from the stop 11. The stop 11 is carried by a stationary bracket 12 which in turn is carried by a stationary plate 13, the bracket 12 functioning further to carry a track block 14 defining a groove 15 extending in the plane of lever motion. Two screws 16 connect the track block 14 to the stationary bracket 12.

Figure 2:
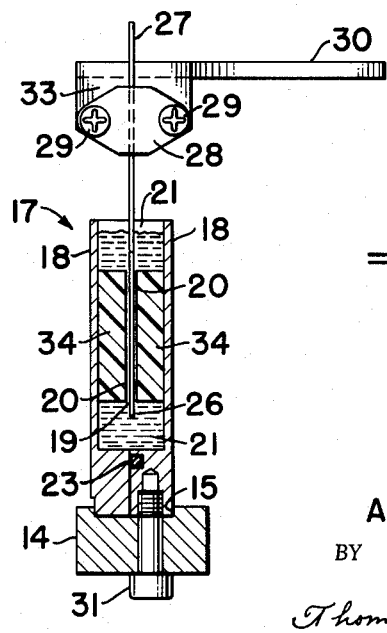
FIG. 2 is a vertical sectional view taken along the line 2—2 of FIG. 1.
Figure 3:
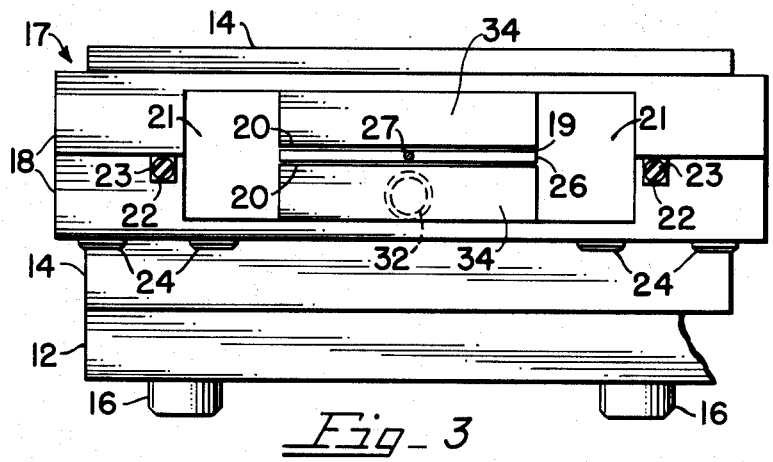
FIG. 3 is a plan view as seen from line 3—3 of FIG. 1.
Figure 4:
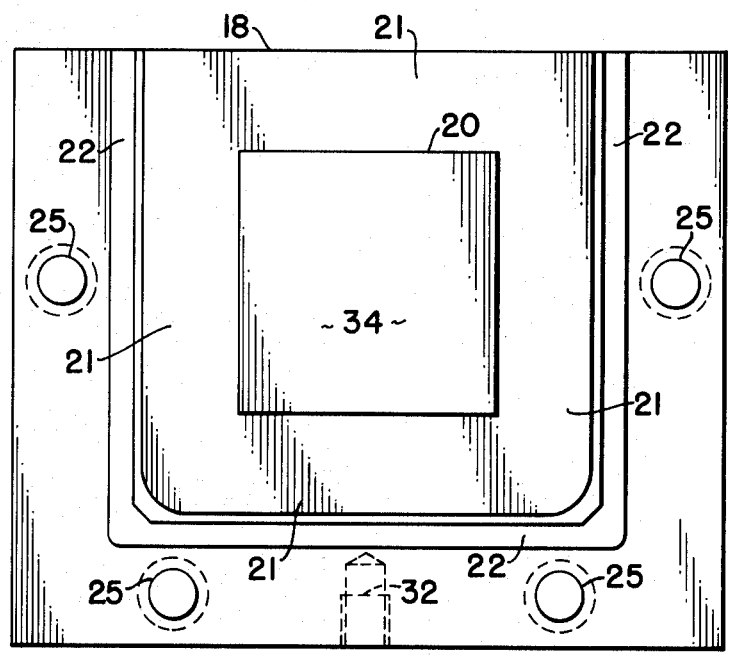
FIG. 4 is a side elevational view of the inside of one of the two dashpot body sections shown in FIG. 3.

Oscillations of the checkweigher, when load upon the checkweigher is changed, are damped by means of a dashpot 17 having a body which includes two sections 18. When assembled, the body is filled with oil the upper level of which is shown in FIG. 2, the oil being removed from the dashpot as shown in FIG. 1 for clarity of illustration. The oil is contained in a cavity with a narrow, restricted area 19 defined by two parallel walls 20 and an enlarged area 21 around all four sides of the restricted area. The inner surfaces of the walls 20 are in the plane of lever motion. One of the body sections 18 is provided with a flat-bottomed U-shaped groove 22 as shown in FIG. 4 which when the two body sections 18 are assembled as shown in FIG. 3 receives a rubber seal 23 which retains the oil in the cavity. The rubber seal 23 is formed by cutting an ordinary rubber O-ring. The body sections 18 are held together by means of four screws 24 which are threaded in tapped holes 25.

A vane 26 (1/16 inch plate) is rigidly connected (brazed) to a rod 27 (1/16 inch diameter) which in turn is rigidly connected to the weighing scale lever 10 by means of a plate 28 that is held by means of screws 29 to a bracket 30 carried by the lever 10. The vane 26 is movable within the restricted area 19 of the body between the parallel walls 20 in the plane of lever motion and produces a damping action by viscous shear. The vane 26 is attached to the lever 10 by a method that ensures that no parts rub. In assembly, the two body sections 18 are connected by means of the four screws 24 and slide into the groove 15 in the track block 14, the adjusted position of the dashpot body in the groove 15 being retained by means of a screw 31 which extends through a slot in the track block 14 and is screwed into a tapped hole 32 in one of the body sections 18. Then shim plates (not shown) are slipped in a snug fit between the sides of the vane 26 and the parallel walls 20, the vane 26 is translated and pivoted until the rod 27 is tangent to a surface 33 of the bracket 30, and the plate 28 is attached by means of the screws 29 to the bracket 30, pinching the rod 27 between the bracket surface 33 and the plate 28. The shim plates then are removed and the cavity is filled with oil. The upper level of the oil, as shown in FIG. 2, is well above the top of the vane 26 so that in operation the vane 26 always is completely immersed.

The restricted area 19 which is defined by the two parallel walls 20 is formed by two juxtaposed polyethylene blocks 34 which automatically make the restricted area more restricted by expansion when the temperature rises or less restricted by contraction when the temperature drops and the viscosity of the oil changes to keep the viscous force about constant with changes in temperature. The material chosen for the blocks 34 is dependent on the temperature-viscosity characteristics of the oil so that the action of the dashpot in damping the scale oscillations is substantially uniform under widely varying temperature conditions. It has been found that polyethylene works well with the usual dashpot fluid to provide automatic compensation in predetermined manner. To attach the polyethylene blocks 34 to the metal body sections 18, epoxy cement is cured on the body sections 18, the polyethylene blocks are heated when in place until the blocks soften and then cooled. The polyethylene is machined until the walls 20 are parallel and in the plane of lever motion. Alternatively, the body sections 18 can be made of one piece of metal with the parallel walls 20 shaped to adjust the effective shear area with temperature changes when moved laterally with respect to the vane by a bimetal strip. In this arrangement, the desired damping action is adjusted by means of a clamp which varies the space between the walls, the bimetal strip moving the walls laterally with respect to the vane to keep the viscous force more or less constant with changes in temperature.

The desired damping action is adjustable and is attained by sliding the dashpot in the stationary grooved block 14 when the screw 31 is loose. The adjustment is made by trial and error until the indicator of the checkweigher has one slight overshoot when a load is placed upon the scale, the indicator then moving back with no oscillation to indicate the correct weight. This adjustment, which does not affect weighing and can be done while weighing takes place, makes the vane 26 operate more or less within the restricted area 19, that part of the vane 26 which does not operate within the restricted area being movable in the oil in the enlarged area 21 around all four sides of the restricted area, i.e., as shown in FIG. 1, lateral movement of the polyethylene blocks 34 with respect to the vane 26 uncovers a portion of the vane to vary the effective shear area.

One of the features of the dashpot resides in the fact that it has no rubbing parts, the vane 26 moving up and down without touching the parallel walls 20.

Another feature resides in the fact that the vane 26 is rigidly connected to the lever 10 through the plate 28 and bracket 30 to eliminate friction at this connection.

Still another feature resides in the automatic temperature compensation, by means of the polyethylene blocks, in predetermined manner corresponding to the temperature-viscosity characteristics of the dashpot fluid.

Another feature resides in the ease of adjustment afforded by sliding the dashpot body in the grooved block 14 to adjust the amount of damping without affecting weighing and while weighing takes place.

The dashpot has superior simplicity and produces no bubbles in the oil when operating at high speeds.

It is to be understood that the above description is illustrative of this invention and that various modifications thereof can be utilized without departing from its spirit and scope.

Having described the invention, I claim:

1. A dashpot for damping the oscillations of a condition responsive member comprising, in combination, a body defining a cavity having a restricted area defined by two walls and an enlarged area around at least part of the restricted area, a vane movable within the areas producing damping action by viscous shear, connecting means for connecting the vane to the member, and means for adjusting the amount of damping afforded by the dashpot by moving the body in the plane of the vane.

2. A dashpot for damping the oscillations of a condition responsive member comprising, in combination, a body defining a cavity having a restricted area defined by two walls and an enlarged area around at least part of the restricted area, a vane movable within the areas producing damping action by viscous shear, connecting means for connecting the vane to the member, and means for selectively adjusting the amount of damping by moving at least one of the walls relative to the vane.

3. A dashpot comprising, in combination, a liquid-filled body defining a cavity having a restricted area defined by two parallel walls and an enlarged area around at least part of the restricted area, a vane movable within the restricted area producing damping action by viscous shear, and a stationary grooved track within which the body is slidable in the plane of the vane for adjusting the amount of damping by varying the area of the vane in the restricted body area and thus varying the effective shear area.

4. A dashpot for damping the oscillations of a condition responsive member comprising, in combination, a vane carried by the member for movement therewith, the vane being oriented with the direction of movement, a body of liquid submerging at least a portion of the vane, a wall within the body juxtaposed to the vane to form the liquid into a film between the vane and the wall for opposing the movement of the vane by the resistance in shear of the film, and means for adjusting the amount of damping afforded by the dashpot by moving the wall parallel to the vane to vary the effective shear area.

5. A dashpot for damping the oscillations of a condition responsive member comprising, in combination, a vane carried by the member for movement therewith, the vane being oriented with the direction of movement, a body of liquid submerging at least a portion of the vane, a wall within the body juxtaposed to the vane to form the liquid into a film between the vane and the wall for opposing the movement of the vane by the resistance in shear of the film, and means for selectively adjusting the amount of damping afforded by the dashpot by moving the wall relative to the vane.

References Cited by the Examiner

UNITED STATES PATENTS

| 2,822,161 | 2/1958 | Tikanen | 73—497 |
| 2,881,868 | 4/1959 | Frykman | 188—100 |
| 2,984,114 | 5/1961 | Bostwick et al. | 188—100 |
| 3,132,725 | 5/1964 | Zeidler | 188—100 |
| 3,161,261 | 12/1964 | Bryant | 188—86 |

FOREIGN PATENTS

| 272,121 | 6/1927 | Great Britain. |

MILTON BUCHLER, *Primary Examiner.*

ARTHUR L. LA POINT, FERGUS S. MIDDLETON,
*Examiners.*